Nov. 22, 1938. L. L. PHELPS 2,137,458
PAN LIFTER
Filed Feb. 21, 1938
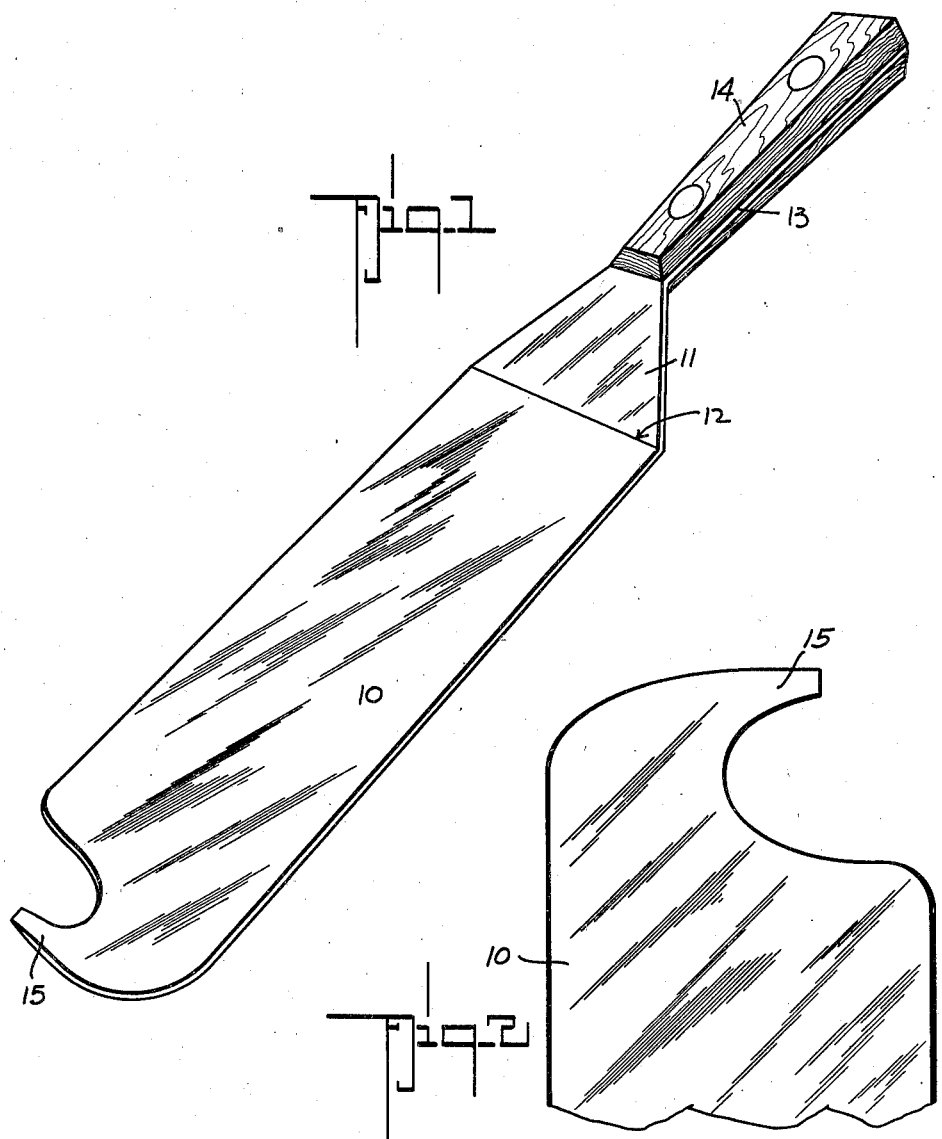

Patented Nov. 22, 1938

2,137,458

UNITED STATES PATENT OFFICE 2,137,458

PAN LIFTER

Letha L. Phelps, Spokane, Wash.

Application February 21, 1938, Serial No. 191,653

5 Claims. (Cl. 294—2)

My present invention relates to pan lifters and is especially adaptable for use in commercial pie bakeries serving to lift the pie pan from the work table into the oven, or to remove the pans from the oven and to permit of considerable facility in arranging the pans or moving them about in the narrow space usual in commercial pie ovens.

While the primary purpose of the invention is to provide a handy and extremely useful implement for professional pie bakers, the device has equal utility in the kitchens of homes or restaurants, serving for lifting things about, to remove covers of cooking vessels, to arrange various utensils about a stove or move them from one place to another, to lift covers from roasters for inspection of the contents, and for carrying bailed vessels from stove to sink for draining or the like.

The invention involves certain novel features of construction and arrangements of shapes and form to meet the purpose of my invention and consists essentially in a spatulate-like blade provided with a suitable handle engaged with one end and a vessel or pan-engaging hook on the other end.

The lifter is especially useful in connection with pie baking, wherein the pies have to be shifted during the course of the baking, since some of the pies will bake faster than others. It is also useful in removing the baked pies for replacement of the newly prepared pies that have to be baked and permits great facility in arrangement of the pies in the oven or the selection of any one of a group during the baking process. With the device constructed as herein explained, burning of the hands or arms by contact with the oven parts may be avoided and the speed of handling enhanced.

In the accompanying drawing I have illustrated one complete example of the physical embodiment of my invention, wherein the parts are combined and arranged according to one mode I have thus far devised for the practical application of the principles of my invention, but it will be understood that changes and alterations may be made in the exemplified structure within the scope of my claims, without departing from the principles of the invention.

Figure 1 is a perspective view of my pan lifter, and

Figure 2 is a fragmentary portion of one end of the lifter.

In order that the general arrangement and relation of parts and the utility of parts may be readily understood, I have indicated a typical spatulate-like scoop or shovel having a comparatively wide blade and having a length approximating the diameter of the usual baker's pie pan. At the rear, the blade is bent upward at an angle and narrowed and then bent substantially parallel with the blade proper to form an elevated handle to which may be attached, if desired, wood or combination handle members, to insure a handle of a size readily grasped in the hand and amenable to the use for which the instrument is designed.

On the forward portion of the blade near the end I cut out a section of blade to form a hook-like member serving the special purpose of catching hold of the pie pan by engaging the underside of the rim of the pan and against the usual downturned bead formed in the pan. In this way I can pull the pan forward from the rear of the oven or otherwise arrange it in the oven.

Generally speaking the lifter consists of the flat blade 10 formed of comparatively thin flexible metal having sufficient tension qualities to lift a pie tin or the like with its contained pie.

At the rear 11 of the blade 10 the blade is narrowed and bent on the line 12 to an angle to raise the handle portion 13 which is formed parallel with the blade a sufficient distance to insure when grasped in the hand that the fingers will not contact the hot oven or the door frame surrounding the oven. This will insure against burning of the hand or fingers. Upon the handle portion 13 may be mounted any suitable handle sections as 14 that will keep the handle more or less cool if necessary and provide means for firmly gripping the lifter during the period of use. The offset handle also insures means for reaching into an oven past a front row of pies in order to engage and remove pies in the rear portion of the oven. The ordinary commercial baker's oven varies in depth from four to sometimes as much as six feet. It is therefore frequently necessary to arrange pies to remove those that have baked earlier and to add others ready for baking in order to insure maximum efficiency of the oven and rapidity of output.

Upon the front end of the blade 10 the blade has a stamped-out portion or a portion is removed therefrom, forming a hook member 15 which may be tapered at the point to insure maximum efficiency and this point normally extends at right angles to the longitudinal axis of the blade.

The portion cut from the blade is of sufficient size to insure a hook that will be practical and of sufficient size to insure the proper use of the point when it is to be engaged with the underside of the rim of a pie pan for arranging the pie pan within the oven.

In use, when pies are to be withdrawn from a rear portion of the oven or to be arranged to one side or the other, the point is hooked under the pie tin flange which is formed with a turned edge, against which the hook may engage. Thus by inserting the lifter to the proper position beneath the pie tin and twisting slightly until engagement is effected the pie tin may be dragged or may be slid from one position to another to accomplish the purpose above explained. If the pie is to be removed bodily and is within reach of the baker the blade may be inserted under the pan and the pan lifted above the others and withdrawn from the oven. Likewise a pan on the work bench may be lifted by the blade and carried to the oven and deposited in its proper place.

If the pie is of such a nature, such as a custard or a pie having extremely fluid filling, it is possible with the instrument herein described to insure against spilling of the contents into the hot oven as it may be readily maintained in a level position during the carrying and placing operation, being aided by the low center of gravity due to the different levels of the blade and handle.

While the above description particularly refers to the use of my lifter in connection with pie baking, the instrument is equally useful in restaurant or home kitchens and for various purposes.

Various articles being cooked may be arranged in their cooking vessels, a lid may be lifted from a pot or pan by the hook 15, a bail may be engaged for carrying the vessel to the sink or like for draining the water. The spatulate-like blade may also serve for turning over various foods, for pressing them against the surface of the pan, and for many other useful functions about a kitchen, the implement in that respect serving as a handy tool in many respects and for many purposes.

Having thus fully described my invention, what I claim as new and desire to secure by Letters Patent is:—

1. In a pan lifter, a longitudinally extending spatulate blade, an offset handle therefor, and a hook formed in the end of the blade.

2. In a pan lifter, a thin flat blade and an offset handle therefor, a hook formed in the blade at the end opposite the handle, said hook extending substantially at right angles to the longitudinal axis of the blade.

3. In a pan lifter, a longitudinally extending spatulate blade and an offset handle therefor, a flange engaging member formed in the end of the blade opposite the handle, said member extending crosswise to the longitudinal axis of the blade.

4. In a pan lifter, a thin flexible spatulate blade, an offset handle therefor, a flange engaging element formed in the end of the blade and having its axis substantially at right angles to the longitudinal axis of the blade, the end of said element terminating short of one side of the blade.

5. A pan lifter comprising a substantially broad and long flexible blade, an offset handle formed on one end of the blade, a right angularly disposed hook formed in the other end of the blade, and a throat between the hook and the blade.

LETHA L. PHELPS.